June 1, 1965
V. SPARWALD
3,186,832
METHOD OF PRODUCING ALUMINUM
Filed Sept. 5, 1962
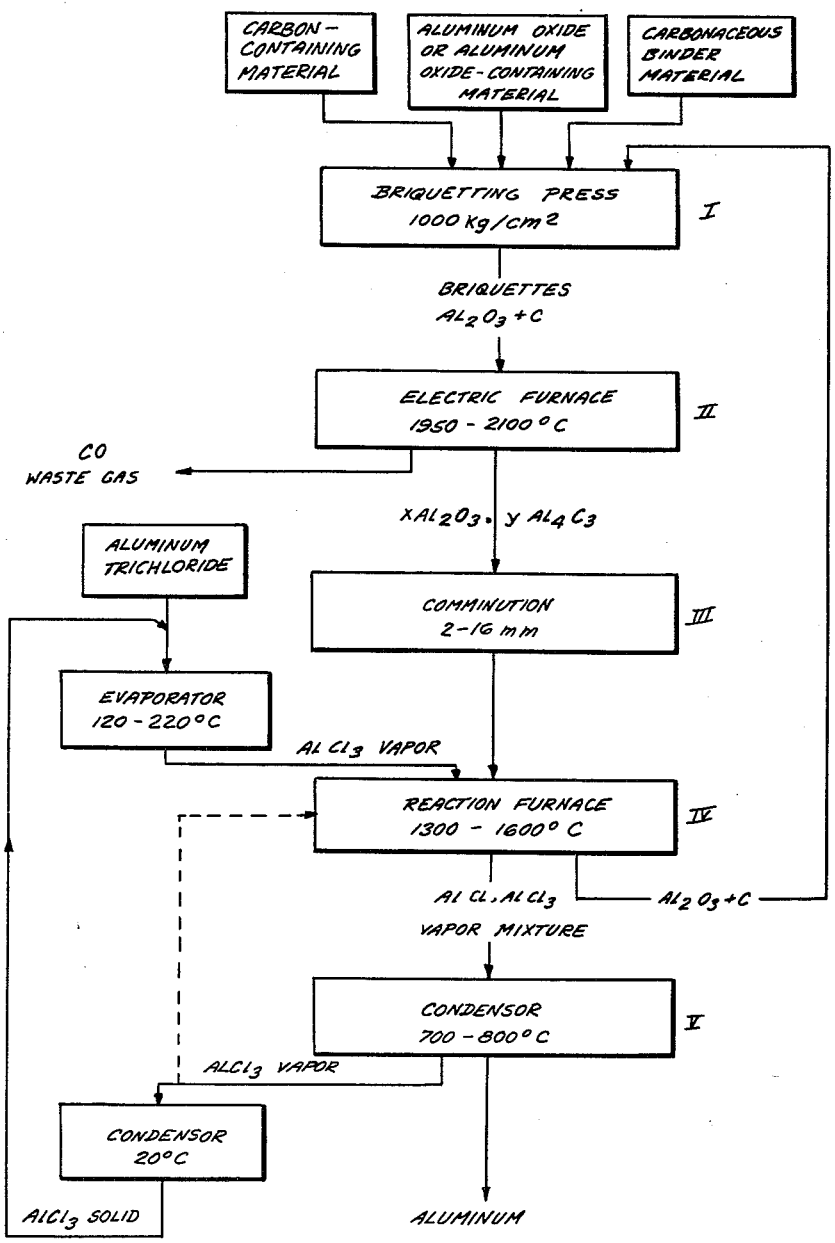
INVENTOR.
Volker Sparwald
BY
Michael S. Striker
Attorney United States Patent Office 3,186,832
Patented June 1, 1965

3,186,832
METHOD OF PRODUCING ALUMINUM
Volker Sparwald, Luenen, Westphalia, Germany, assignor to Vereinigte Aluminium-Werke Aktiengesellschaft, Bonn, Germany
Filed Sept. 5, 1962, Ser. No. 221,581
Claims priority, application Germany, Sept. 9, 1961, V 21,288
9 Claims. (Cl. 75—68)

The present invention relates to a method of producing aluminum and, more particularly to a method of producing aluminum from a reaction product which is obtained by thermal reaction of aluminum oxide with carbon-containing material.

The various thermal methods of producing aluminum are, for instance, described in an article by Herrmann which appeared in the journal "Aluminium" 1961, pages 143ff. This article is particularly concerned with discussing the thermal production of aluminum in the light of the patent literature. This article and other publications describe as old to form briquettes of aluminum carbide and magnesium fluoride and to heat these briquettes to about 1145° C. under partial vacuum, namely a residual pressure of 0.37 mm. mercury. This reaction results in the precipitation of aluminum droplets at the cooler end of the retort and it is described that a yield of about 70% of the initial aluminum content could be achieved. Other prior art methods propose to produce briquettes of a mixture of two parts by weight of aluminum oxide powder and one part by weight of carbon powder and to heat these briquettes in the presence of gaseous aluminum chloride.

When this reaction is carried out at a temperature of about 1200° C. then it is indeed possible to obtain small amounts of aluminum which are substantially free of carbon and aluminum oxide. However, due to the relatively low reaction temperature, the yield is very low and this is clearly shown by the fact that only between about 1 and 2% of the amount of aluminum trichloride which has to be applied actually will be reacted. The fact that relatively pure aluminum can be produced in this manner is based exclusively on the very low concentration of the aluminum monochloride vapors which are formed during the reaction while simultaneously carbon monoxide is present in the gas phase also only in very small amounts. However, it is uneconomical to carry out this method at about 1200° C. since the reaction and yield are below 2%.

If it is then attempted to carry out the above-described method, i.e., the reaction of aluminum oxide powder and carbon powder under simultaneous introduction of aluminum trichloride vapors at higher temperature such as 1500° C. then it is possible to increase the concentration of aluminum monochloride vapors in the gas phase, however simultaneously considerable quantities of carbon monoxide are formed so that in the condenser a reversal of the reaction takes place and aluminum is again oxidized according to the following equation:

(I)    $9AlCl + 3CO \rightarrow Al_2O_3 + Al_4C_3 + 3AlCl_3$

For the above discussed and other reasons, this method did not meet with practical success.

It is therefore an object of the present invention to overcome the difficulties and disadvantages of conventional thermal methods of producing aluminum from aluminum oxide and the like.

It is another object of the present invention to provide a method according to which aluminum can be produced from an aluminum oxide-containing raw material in a relatively high yield and in a simple and economical manner.

Other objects and advantages of the present invention will become apparent from a further reading of the description and of the appended claims.

With the above and other objects in view, the present invention comprises in a method of producing aluminum, the steps of reacting a material consisting essentially of aluminum oxide and aluminum carbide at an elevated temperature with gaseous aluminum trihalide so as to produce a gaseous mixture of aluminum monohalide and aluminum trihalide, cooling the gaseous mixture so as to transform the same into liquid aluminum and gaseous aluminum trihalide, and separately recovering the thus formed aluminum and aluminum trihalide.

According to a preferred embodiment, the method of the present invention includes the steps of reacting at a first elevated temperature of between about 1,950 and 2,100° C. a mixture including aluminum oxide and carbonaceous material in a proportion of between 80 and 90 percent by weight of aluminum oxide and between 20 and 10 percent by weight of carbon so as to produce therefrom a liquid material containing up to about 35% by weight of aluminum carbide, the balance of the reaction product consisting essentially of aluminum oxide and carbon; cooling the thus produced material so as to solidify the same, comminuting the solidified material to a particle size of between about 2 and 16 mm. so that the entire material will pass through a screen of ⅝ inch mesh, reacting the comminuted material in a carbon oxide-free atmosphere at a second elevated temperature of between about 1,300 and 1,600° C. with gaseous aluminum trichloride so as to produce a gaseous mixture of aluminum monochloride and aluminum trichloride, cooling the gaseous mixture to below about 900° C. so as to transform the same into liquid aluminum and gaseous aluminum trichloride, and separately recovering the thus formed aluminum and aluminum trichloride.

Thus, according to the present invention aluminum will be produced of an aluminum carbide-containing mixture by heating in a first major reaction step at a temperature of between 1950 and 2100 ° C., preferably between 2000 and 2050°, a mixture of between 80 and 90% by weight, preferably 85% by weight, of aluminum oxide ($Al_2O_3$) and between 20 and 10% per weight, preferably 15% by weight, of carbon and to cool the molten reaction product formed thereby which reaction product consists of up to 35% by weight of aluminum carbide ($Al_4C_3$) the balance being aluminum oxide and carbon. The cooled and thus solidified reaction product is then preferably comminuted to a particle size of between 2 and 16 mm. so that the entire comminuted material will pass through a screen of ⅝ inch mesh. Thereafter the comminuted material is heated to a temperature of between about 1300 and 1600° C. preferably between 1400 and 1500° C. and, at that temperature, reacted with gaseous aluminum trichloride ($AlCl_3$) which is applied in an amount by weight equal to between 400 and 200%, preferably between 400 and 800% of the aluminum carbide content of the comminuted mixture.

Whenever herein reference is made to aluminum oxide, it is also possible to use in place of pure aluminum oxide a material which contains substantial proportions of the same, such as bauxites which should contain at least 60% aluminum oxide. Preferably, however, the aluminum oxide obtained by the Bayer method will be used, i.e. an oxide which is formed by decomposition of bauxite with sodium hydroxide under pressure, subsequent dilution of the sodium aluminate lye, crystallization under stirring of the aluminum oxide hydrate and subsequent calcination at a temperature of 1000° C.

Furthermore, whenever carbon is mentioned as a raw material, it need not be pure carbon and, in fact, generally will be a carbonaceous material such as oil coke, peat coke, charcoal or pitch. However, the percentage figures given above and throughout the present application refer to the aluminium oxide or carbon content only of the respective materials.

For the reaction of aluminum carbide with aluminum trihalides under formation of aluminum monohalides besides aluminum trichloride also the other halides as aluminum trifluoride, aluminum tribromide and aluminum triiodide are applicable, but for economic reasons aluminum trichloride is preferred.

The treatment of the reaction product obtained by heating aluminum oxide and a carbonaceous material to temperatures of between about 1950 and 2100° C., i.e., the treatment of the material consisting essentially of aluminum oxide and aluminum carbide, can then be carried out with aluminum trihalide vapors in various manners. For instance, aluminum trichloride vapors may be passed over the comminuted reaction product of the above described first major process step, or, the compacting of the comminuted reaction product with the aluminum trichloride or the like may also be carried out in a fluidized bed arrangement.

It is advantageous to use the starting material for the first major process step in the form of briquettes which may be formed under a pressure of 1000 kg./cm.² and by incorporating into the mixture a pitch which is solid at room temperature and liquid at selected elevated temperatures.

The pitch, for instance, may have the following composition:

(II)

| | |
|---|---|
| Bound carbon | 53% |
| Ash | 0.3–0.5% |
| Volatile constituents | Balance |
| Softening point | 83° C. |

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the drawing is a flow sheet schematically illustrating the process of the present invention.

Describing now the process with reference to the drawing, it will be seen that in the process step indicated by I, the mixture of starting materials, namely, an aluminum oxide-containing material, carbon-containing material and carbonaceous binder material will be briquetted.

In the next following process step II which corresponds to the above described first major process step, the briquettes which contain aluminum oxide and carbon are reacted in a one or multi-phase electric arc furnace at a temperature of between 1950 and 2100° C. preferably between 2000 and 2050° C.

Thereby, a molten compound is formed between aluminum oxide and aluminum carbide, in accordance with the following equation:

(III) 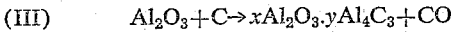  $Al_2O_3 + C \rightarrow xAl_2O_3 \cdot yAl_4C_3 + CO$

Together with the molten mixture or compound of aluminum oxide and aluminum carbide, carbon monoxide will be formed and withdrawn as a waste gas, as far as the present process is concerned.

In the next following process step III, the molten mixture obtained in process step II is permitted to cool so as to solidify and is then comminuted to a particle size of between 2 and 16 mm.

Process step IV corresponds to the second major process step of the present invention, namely, to reacting the comminuted reaction product of process step II at a temperature of between about 1300 and 1600° C., preferably between 1400 and 1500° C., with gaseous aluminum trichloride. Process step IV preferably is carried out under exclusion of air and in the absence of carbon oxide.

In reaction step IV the sum of the partial pressures of aluminum trichloride and aluminum monochloride can move between about 5 mm. mercury up to 1 atm. Corresponding to the applied pressure the temperature is to be regulated in the indicated temperature range of about 1300 to 1600° C. in such a manner that the temperatures preferred for a pressure of about 5 to 15 mm. mercury lie within the range of about 1300 to 1350° C. and increase with rising pressure, so that for a pressure of about 300 to 400 mm. mercury a temperature range of about 1400 to 1500° C. is to be maintained, and for a pressure of about 1 atmosphere a temperature range of about 1500 to 1600° C. Process step IV preferably is carried out at a pressure of about 300 to 400 mm. mercury and correspondingly at a temperature of about 1400 to 1500° C.

By reacting the aluminum trichloride vapors with the comminuted reaction product of process step II, in accordance with the following equation:

(IV) 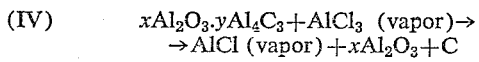  $xAl_2O_3 \cdot yAl_4C_3 + AlCl_3 \text{ (vapor)} \rightarrow$
$\rightarrow AlCl \text{ (vapor)} + xAl_2O_3 + C$ the aluminum oxide-aluminum carbide compound and the aluminum trichloride will form aluminum monochloride which will escape from the reaction furnace of process step IV in gaseous form while in the reaction furnace will remain, in addition to a small proportion of non-reacted aluminum oxide-aluminum carbide compound, primarily corundum (alpha $Al_2O_3$) and carbon in the form of graphite. This residue of process step IV preferably is recycled so as to form part of the mixture of which briquettes are formed in process step I.

It is a surprising result of proceeding in accordance with the present invention as described above that, by properly selecting temperatures and pressure (sub-atmospheric pressure) for process step IV, no carbon monoxide is formed notwithstanding the presence of aluminum oxide and carbon. Thus, due to the fact that the process of step IV is carried out in the absence of oxygen or carbon monoxide, it is also not possible that the freed aluminum could be again oxidized and re-transformed into aluminum oxide.

The gaseous aluminum monochloride as well as a portion of the gaseous aluminum trichloride which had been introduced into the reaction furnace of process step IV are then withdrawn and this gaseous mixture of mono- and trichlorides of aluminum is then introduced into a condenser in which the mixture is cooled to between about 800 and 900° C. Upon such cooling, and in accordance with the equation:

(V)   $3AlCl \text{ (vapor)} \rightarrow 2Al \text{ (liquid)} + AlCl_3 \text{ (vapor)}$ the gaseous aluminum monochloride will be decomposed into liquid aluminum and gaseous aluminum trichloride.

The liquid aluminum is withdrawn from the condenser and the gaseous aluminum trichloride may either be passed to a second condenser in which the aluminum trichloride is further cooled so as to be solidified, or it may be recycled in gaseous form into the reaction furnace in which process step IV is carried out.

It is advantageous to operate the process step II in such a manner that after the slow melting down of the charge, the reduction of the aluminum oxide is terminated when the melt starts to show a considerable increase in viscosity.

Exhaustive experiments have shown that according to the method of the present invention it is possible to react in process step IV a very large percentage, actually about 90% of the total aluminum carbide.

It is a particular advantage of the present invention that in process step IV, the compound $xAl_2O_3 \cdot yAl_4C_3$ can be introduced, which compound may be produced with a relatively low expenditure of energy. Furthermore, it is possible to produce this compound at relatively low temperatures so that there is practically no danger of evaporation losses due to direct formation of aluminum suboxide or aluminum vapors which at higher temperatures might occur in accordance with the following equations:

(VI)   $Al_2O_3 + 2C \rightarrow Al_2O$ (vapor) $+ 2CO$
       $xAl_2O_3 + 3C \rightarrow 2Al$ (vapor) $+ 3CO$ This danger is avoided according to the present invention, since at temperatures of up to about 2100° C. the reactions of Equations VI will not take place in an important extent.

The following examples are given as illustrative only of the present invention without, however, limiting the invention to the specific details of the examples.

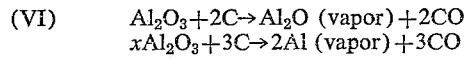

Example I

In a heatable kneading device, a mixture of 85 parts per weight of aluminum oxide, 5 parts per weight of peat coke and 20 parts per weight of pitch is formed. The peat coke contains about 85% carbon and 15% of volatile constituents and ash. The composition of the pitch may be the same as that which has been described under (II) further above. The thus formed mixture is then pressed into spherical briquettes having a diameter of about 70 mm.

The briquettes are introduced into an electric arc furnace and molten therein, in accordance with process step II of the drawing. For this purpose a temperature of about 2000° C. is applied and the time required will depend on the quantity of briquettes which are to be thus treated.

In accordance with process step II, the molten mixture will react under formation of compounds of the type $xAl_2O_3 \cdot yAl_4C_3$. As soon as the melt has reached a temperature of 2100° C. or preferably of 2050° C., the melt is permitted to stand at such temperature until it becomes highly viscous. Thereafter, the melt is either tapped or permitted to cool in the electric arc furnace. The solidified reaction product is then comminuted to a particle size of between 2 and 16 mm. The composition of the reaction product is about as follows:

(VII)

29.8%—$Al_4C_3$
62.6%—$Al_2O_3$
7.6%—Insolubles (corundum and carbon)

The above mentioned 29.8% $Al_4C_3$ and 62.6% $Al_2O_3$ form together aluminum oxide-aluminum carbide compounds and amount to 92.4% of the reaction product.

If immediate further processing of this reaction product is not desired then it must be stored in closed containers since the aluminum carbide compounds would form methane when exposed to the moisture of the atmosphere and would be decomposed thereby, whereby the yield of aluminum in process step IV would be reduced.

Process step IV is carried out in a reaction furnace which preferably will be formed as a gas-tight tower in which subatmospheric pressure can be maintained and the interior of which is lined with a carbon tube into which the charge is introduced and which simultaneously will serve as electric resistance heater for heating the charge to the reaction temperature of between about 1400 and 1500° C. After heating to such temperature and evacuation of air from the reaction furnace, vaporized aluminum trichloride, which in a separate evaporator had been heated to about 200° C. and thus vaporized, is introduced so as to fill the interior of the reaction furnace with aluminum trichloride vapors. Thereafter, the furnace is charged with the comminuted reaction product of process step II. This preferably is done by first evacuating the storage container holding the comminuted reaction product and replacing the removed air with argon, so that no air will be introduced into the reaction furnace together with the comminuted material. The comminuted reaction product from process step II will pass through the reaction furnace preferably in downward direction, while simultaneously aluminum trichloride vapors are introduced through the bottom portion of the reaction furnace and will pass upwardly in countercurrent flow to the comminuted material, whereby the sum of the partial pressures of aluminum monochloride and aluminum trichloride in the furnace amounts to about 350 mm. Hg. During such passage, the aluminum trichloride vapors will react with the comminuted material and more and more aluminum monochloride vapors will be formed.

The thus formed mixture of gaseous aluminum trichloride and aluminum monochloride will collect above the column of charged comminuted material and will be conveyed through a short conduit formed of sintered corundum into a condenser which also is formed of, or has an inner lining of, sintered corundum. By cooling the vapors in the condenser from about 1300° C. to between about 700° C. and 900° C., preferably between 700 and 800° C., aluminum is precipitated in liquid form and can be removed by tapping. The aluminum trichloride which remains in vapor form is then passed to a second condenser in which it is cooled to room temperature and thereby precipitated in solid form.

The aluminum which is recovered from the condenser of process step V is of extraordinarily high purity. It contains less than 0.01% iron, less than 0.01% silicon, less than 0.001% titanium, the balance being aluminum.

From 100 parts by weight of the reaction product of process step II, 20 parts by weight of metallic aluminum were recovered. For this purpose, 3 parts by weight of aluminum trichloride were required for each part by weight of the aluminum oxide aluminum carbide compound $xAl_2O_3 \cdot yAl_4C_3$.

The residue which is withdrawn from process step IV is composed of about 3.5% of the aluminum oxide-aluminum carbide compounds which were not reacted, about 10.8% of carbon in the form of graphite and the balance of 85.7% consists of aluminum oxide.

This residue may be recycled from process step IV to process step I and, together with additional carbonaceous material and aluminum oxide, may be pressed into briquettes for further processing as described above.

Example II

According to the present example, the process is carried out substantially as described in Example I, however, with the difference that in process step IV, in which gaseous aluminum trichloride is introduced into the reaction furnace, a reaction temperature of between 1300 and 1350° C. is maintained and simultaneously the interior of the reaction furnace is maintained under a subatmospheric pressure of 10 mm. mercury. Under these conditions, in order to react the same amount of the reaction product of process step II, only half of the amount of aluminum trichloride which was needed according to Example I is required, however, the time period for the reaction is about twice as long as according to Example I.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Method of producing aluminum, which comprises reacting a material consisting essentially of aluminum oxide and aluminum carbide in an atmosphere free of oxygen and of carbon oxide at a temperature of between about 1400 and 1500° C. with an aluminum trihalide which is gaseous at said temperature to form a gaseous mixture comprising said aluminum trihalide and formed aluminum monohalide, and maintaining the sum of the partial pressures of said aluminum trihalide and said aluminum monohalide at between about 300 and 400 mm. Hg, thereby preventing formation of carbon monoxide which would reoxidize said aluminum monohalide to aluminum oxide, aluminum carbide and aluminum trihalide; cooling said gaseous mixture to between about 700 and 900° C. so as to transform the same into aluminum in liquid condition and gaseous aluminum trihalide; and separately recovering the thus formed aluminum and said aluminum trihalide.

2. Method of producing aluminum, which comprises reacting a material consisting essentially of aluminum oxide and aluminum carbide in an atmosphere free of oxygen and of carbon oxide at a temperature of between about 1400 and 1500° C. with aluminum trichloride which is gaseous at said temperature to form a gaseous mixture comprising said aluminum trichloride and formed aluminum monochloride, and maintaining the sum of the partial pressures of said aluminum trichloride and said aluminum monochloride at between about 300 and 400 mm. Hg, thereby preventing formation of carbon monoxide which would reoxidize said aluminum monochloride to aluminum oxide, aluminum carbide and aluminum trichloride; cooling said gaseous mixture to between about 700 and 900° C. so as to transform the same into aluminum in liquid condition and gaseous aluminum trichloride; and separately recovering the thus formed aluminum and said aluminum trichloride.

3. Method of producing aluminum, which comprises passing gaseous aluminum trichloride through a particulate material consisting essentially of aluminum oxide and aluminum carbide in an atmosphere free of oxygen and of carbon oxide at a temperature of between about 1400 and 1500° C. with aluminum trichloride which is gaseous at said temperature to form a gaseous mixture comprising said aluminum trichloride and formed aluminum monochloride, and maintaining the sum of the partial pressures of said aluminum trichloride and said aluminum monochloride at between about 300 and 400 mm. Hg, thereby preventing formation of carbon monoxide which would reoxidize said aluminum monochloride to aluminum oxide, aluminum carbide and aluminum trichloride; cooling said gaseous mixture to between about 700 and 900° C. so as to transform the same into aluminum in liquid condition and gaseous aluminum trichloride; and separately recovering the thus formed aluminum and said aluminum trichloride.

4. Method of producing aluminum, which comprises reacting a mixture of aluminum oxide and a carbonaceous material at a temperature between about 1950 and 2100° C. so as to form therefrom a material consisting essentially of aluminum oxide and aluminum carbide; reacting the thus formed material in an atmosphere free of oxygen and of carbon oxide at a temperature of between about 1400 and 1500° C. with aluminum trichloride which is gaseous at said temperature to form a gaseous mixture comprising said aluminum trichloride and formed aluminum monochloride, and maintaining the sum of the partial pressures of said aluminum trichloride and said aluminum monochloride at between about 300 and 400 mm. Hg, thereby preventing formation of carbon monoxide which would reoxidize said aluminum monochloride to aluminum oxide, aluminum carbide and aluminum trichloride; cooling said gaseous mixture to between about 700 and 900° C. so as to transform the same into aluminum in liquid condition and gaseous aluminum trichloride; and separately recovering the thus formed aluminum and said aluminum trichloride.

5. Method of producing aluminum, which comprises reacting a mixture of about 80–90% by weight of aluminum oxide and about 20–10% by weight of a carbonaceous material at a temperature between about 1950 and 2100° C. so as to form therefrom a material consisting essentially of aluminum oxide and up to about 35% by weight of aluminum carbide; reacting the thus formed material in an atmosphere free of oxygen and of carbon oxide at a temperature of between about 1400 and 1500° C. with aluminum trichloride which is gaseous at said temperature to form a gaseous mixture comprising said aluminum trichloride and formed aluminum monochloride, and maintaining the sum of the partial pressures of said aluminum trichloride and said aluminum monochloride at between about 300 and 400 mm. Hg, thereby preventing formation of carbon monoxide which would reoxidize said aluminum monochloride to aluminum oxide, aluminum carbide and aluminum trichloride; cooling said gaseous mixture to between about 700 and 900° C. so as to transform the same into aluminum in liquid condition and gaseous aluminum trichloride; and separately recovering the thus formed aluminum and said aluminum trichloride.

6. Method of producing aluminum, which comprises reacting a mixture of about 80–90% by weight of aluminum oxide and about 20–10% by weight of a carbonaceous material at a temperature between about 1950 and 2100° C. so as to form therefrom a liquid reaction material consisting essentially of aluminum oxide and up to about 35% by weight of aluminum carbide; cooling the thus formed liquid reaction material to a temperature sufficiently low to solidify the same; comminuting the thus solidified material to a particle size of between about 2 and 16 mm. so that the entire material will pass through a screen of ⅝ inch mesh; reacting the thus formed comminuted material in an atmosphere free of oxygen and of carbon oxide at a temperature of between about 1400 and 1500° C. with aluminum trichloride which is gaseous at said temperature to form a gaseous mixture comprising said aluminum trichloride and formed aluminum monochloride, and maintaining the sum of the partial pressures of said aluminum trichloride and said aluminum monochloride at between about 300 and 400 mm. Hg, thereby preventing formation of carbon monoxide which would reoxidize said aluminum monochloride to aluminum oxide, aluminum carbide and aluminum trichloride; cooling said gaseous mixture to between about 700 and 900° C. so as to transform the same into aluminum in liquid condition and gaseous aluminum trichloride; and separately recovering the thus formed aluminum and said aluminum trichloride.

7. Method of producing aluminum, which comprises briquetting a mixture of aluminum oxide and sufficient carbonaceous material to act as a binder; heating the thus formed briquettes at a temperature between about 1950 and 2100° C. so as to form therefrom a material consisting essentially of aluminum oxide and aluminum carbide; reacting the thus formed material in an atmosphere free of oxygen and of carbon oxide at a temperature of between about 1400 and 1500° C. with aluminum trichloride which is gaseous at said temperature to form a gaseous mixture comprising said aluminum trichloride and formed aluminum monochloride, and maintaining the sum of the partial pressures of said aluminum trichloride and said aluminum monochloride at between about 300 and 400 mm. Hg, thereby preventing formation of carbon monoxide which would reoxidize said aluminum monochloride to aluminum oxide, aluminum carbide and aluminum trichloride; cooling said gaseous mixture to between about 700 and 900° C. so as to transform the same into aluminum in liquid condition and gaseous aluminum trichloride; and separately recovering the thus formed aluminum and said aluminum trichloride.

8. Method of producing aluminum, which comprises briquetting a mixture of about 80–90% by weight of aluminum oxide and about 20–10% by weight of a carbonaceous material; heating the thus formed briquettes at a temperature between about 1950 and 2100° C. so as to form therefrom a liquid reaction material consisting essentially of aluminum oxide and up to about 35% by weight of aluminum carbide; cooling the thus formed liquid reaction material to a temperature sufficiently low to solidify the same; comminuting the thus solidified material to a particle size of between about 2 and 16 mm. so that the entire material will pass through a screen of ⅝ inch mesh; reacting the thus formed comminuted material in an atmosphere free of oxygen and of carbon oxide at a temperature of between about 1400 and 1500° C. with aluminum trichloride which is gaseous at said temperature to form a gaseous mixture comprising said aluminum trichloride and formed aluminum monochloride, and maintaining the sum of the partial pressures of said aluminum trichloride and said aluminum monochloride at between about 300 and 400 mm. Hg, thereby preventing formation of carbon monoxide which would reoxidize said aluminum monochloride to aluminum oxide, aluminum carbide and aluminum trichloride; cooling said gaseous mixture to between about 700 and 900° C. so as to transform the same into aluminum in liquid condition and gaseous aluminum trichloride; and separately recovering the thus formed aluminum and said aluminum trichloride.

9. Method according to claim 8 wherein said separately recovered aluminum trichloride is reintroduced into the reaction cycle for reaction with said material consisting essentially of aluminum oxide and aluminum carbide.

References Cited by the Examiner
UNITED STATES PATENTS

| | | | |
|---|---|---|---|
| 2,470,305 | 5/49 | Gross | 75—68 |
| 2,829,961 | 4/58 | Miller et al. | 75—68 |
| 2,974,932 | 3/61 | Grunert et al. | 75—68 |

FOREIGN PATENTS 462,975 12/49 Canada.

BENJAMIN HENKIN, *Primary Examiner.*

WINSTON A. DOUGLAS, *Examiner.*